United States Patent [19]

Cipriano et al.

[11] Patent Number: 4,877,695
[45] Date of Patent: Oct. 31, 1989

[54] NON-AQUEOUS ELECTROCHEMICAL CELL

[75] Inventors: Robert A. Cipriano, Lake Jackson; R. Vernon Snelgrove, Damon; Francis P. McCullough, Jr., Lake Jackson, all of Tex.

[73] Assignee: The Dow Chemical Company, Midland, Mich.

[21] Appl. No.: 265,652

[22] Filed: Nov. 1, 1988

Related U.S. Application Data

[63] Continuation-in-part of Ser. No. 250,789, Sep. 28, 1988, which is a continuation-in-part of Ser. No. 4,003, Jan. 16, 1987, abandoned, which is a continuation-in-part of Ser. No. 3,974, Jan. 16, 1987, abandoned.

[51] Int. Cl.$^4$ ............................................. H01M 6/20
[52] U.S. Cl. ..................................... 429/102; 429/201
[58] Field of Search ............... 429/102, 101, 112, 218, 429/199, 201, 197

[56] References Cited

U.S. PATENT DOCUMENTS 3,870,561 3/1975 Charbonnier et al. .............. 429/102

Primary Examiner—Anthony Skapars
Attorney, Agent, or Firm—John Lezdey; Joe R. Prieto

[57] ABSTRACT

An electrochemical cell comprising an anode composed of a molten mixture of non-lithium alkali metals, a cathode comprising an electrically conductive carbonaceous material and an electrolyte comprising an electrolyte salt and a non-aqueous solvent.

9 Claims, 2 Drawing Sheets

NON-AQUEOUS ELECTROCHEMICAL CELL

Related Application

This application is a continuation-in-part of application Ser. No. 250,789 filed Sept. 28, 1988, of McCullough et al, which is a continuation-in-part of application Ser. No. 004,003, filed Jan. 16, 1987, now abandoned and application Ser. No. 003,974, filed Jan. 16, 1987, of McCullugh et al, now abandoned.

Field of the Invention

The present invention relates to a non-aqueous electrochemical cell which has a high discharge capacity and high discharge efficiency in high rate discharge and which has excellent size stability. More particularly, the invention is concerned with a non-aqueous electrochemical cell using as active anode material a molten non-lithium mixture of alkali metals.

BACKGROUND OF THE INVENTION

A non-aqueous electrochemical cell using lithium as an active anode material has high energy density, good storage characteristics and wide operation temperature range. A non-aqueous electrochemical cell is therefore often used as a power source for a calculator, a watch or a memory back up system. Such a cell comprises an anode, an electrolyte and a cathode. In general, such a cell uses as an anode an alkali metal such as lithium or sodium; as an electrolyte or electrolytic solution, a solution of a solute such as lithium perchlorate or lithium tetrafluoroborate in a non-aqueous solvent such as propylene carbonate, $\gamma$-butyrolactone or diglyme; and as a cathode, manganese dioxide or poly-carbonmonofluoride.

The combination of relatively high theoretical energy density, potentially long life, and low cost materials such as reported in the sodium-sulfur system high temperature batteries has been reported in the literature as suitable for low rate performance work such as electric road vehicle propulsion or load leveling of electric power supplies. The sodium-sulfur systems, first proposed in 1966, has had a great deal of effort expended in trying to develop a practical system. The basic operating principle involves the separation of two active molten materials, sodium and sulfur, by either a ceramic membrane of beta alumina or sodium glass, which at about 300° C. or higher allows the passage of sodium ions that form with the sulfur any of the several polysulfides. The open circuit voltage of the system is at just over 2 volts, about the same as the lead-acid cell. Two formidable problems exist at the present time, viz., cracking of the separator and corrosion of the casing and seal.

Another somewhat similar system is the lithium-iron sulfide system, operating at about 450° C. However, insufficient development has been done to date to demonstrate the widespread practicality of this system.

Another of the developments being pursued involves a lithium-based cell, in which the negative electrode is a lithium alloy (typically either lithium-aluminum or lithium-silicon), the positive electrode is an iron sulfide, and the electrolyte is a molten salt, such as the eutectic composition in the lithium chloride-potassium chloride system. Because of the high melting point of such salts, such cells must be operated in the temperature range of 400–500 degrees centigrade.

This requirement to operate at such high temperatures has several important disadvantages. One of these is that various degradation processes, such as corrosion of the cell container, seals, and other components are accelerated by such high temperatures. Another is that a substantial amount of energy is lost through heat transfer to the surroundings. Still another is that the voltage obtained from such cells is lower at elevated temperatures, due to the fundamental property of the negative temperature dependence of the free energy of the cell reaction. Furthermore, the higher the temperature of operation, the greater the potential problems related to damage to the cell during cooling to ambient temperature and reheating, whether deliberate or inadvertent. Differences in thermal expansion, as well as dimensional changes accompanying phase changes, such as the freezing of the molten salt, can cause severe mechanical distortions, and therefore damage to cell components.

Cells involving a lower temperature molten salt electrolyte have been investigated where the molten salt is based upon a solution of aluminum chloride and an alkali metal chloride. However, such salts are not stable in the presence of the respective alkali metals. As a result, an auxiliary solid electrolyte must be used to separate the alkali metal and the salt. One example of such a cell involves a molten sodium negative electrode, a solid electrolyte of sodium beta alumina, a molten aluminum chloride-sodium chloride salt, and either antimony chloride or an oxychloride dissolved in the chloride salt as the positive electrode reactant.

Such a cell can operate in the temperature range 150–250 degrees centigrade. It has the disadvantage of having to employ an electrolyte, which increases the cell impedance, as well as adding to the cost and complexity.

U.S. Pat. No. 3,844,837 to Bennion et al discloses a nonaqueous battery in which the anode may be lithium and/or graphite on which lithium metal is deposited and as a positive electrode a platinum cup filled with powdered $K_2SO_4$ and graphite is utilized. The electrolytes disclosed are $LiClO_4$, $LiCF_3SO_3$ or $LiBF_4$ dissolved in dimethyl sulfite.

SUMMARY OF THE INVENTION

In accordance with the present invention there is provided a non-aqueous electrochemical cell for use in primary-rechargeable storage devices. The cell comprises a pair of electroconductive electrodes electrically insulated from contact, a solid electrolyte and an organic electrolyte solvent which is suitable for use in batteries.

The cathode or positive electrode may comprise a carbonaceous electrically conductive fibrous or sheet material, graphite, a composite of graphite and an inert polymer such as Teflon, or any of the conventional metal or metal oxide electrodes, for example zinc, cadmium, aluminum, platinum, etc. Preferably, the cathode comprises fibrous carbonaceous material which is associated with a current collector. Advantageously, the carbonaceous material comprises an activated carbon fabric.

The anode or negative electrode comprises a molten mixture of at least two elements selected from the group consisting of cesium, rubidium, potassium, and sodium.

The preferred electroconductive carbonaceous cathode material used in the invention is more fully described in copending application Ser. No. 558,239, entitled Energy Storage Device, filed Dec. 15, 1983, now abandoned and Ser. No. 678,186, entitled Secondary Electrical Energy Storage Device and an Electrode Therefore, filed Dec. 4, 1984, each by F. P. McCullough and A. F. Beale, which applications are incorporated herein by reference in their entirety. Simply, the preferred carbonaceous material is a fiber spun from stabilized polymeric material such as pitch based material or polyacrylonitrile based fibers. These fibers are stabilized by oxidation and thereafter made electroconductive by carbonization at temperatures of above 850° C., and preferably above 1700° C. Advantageously, the carbonaceous fibers have a Young's Modulus of greater than about one million psi, and preferably about five million psi. The upper limit for practical manufacturing is about 100 million psi, although as production techniques improve it may be possible to use a material which has a higher Young's Modulus. However, such material is at present considered to be much too brittle to withstand manufacture into electrodes, as well as, the rigors of use to which a battery may be subjected. The carbonaceous material should have sufficient strength to withstand the encapsulation without loss of electrical contact between the carbon particles. Thus, one can employ a carbonaceous material defined in the foregoing application as well as many other forms of electroconductive carbons such as GRAFOIL when they are encapsulated in the manner hereinafter described.

The carbonaceous electrode, when constructed as a cloth or sheet, includes an electron collector conductively associated with the carbonaceous fibers or sheet. The electrode conductor interface is preferably further protected by a material to insulate the collector and to substantially protect the electron collector from contact with the electrolyte and its ions. The protective material must, of course, be unaffected by the electrolyte and its ions.

The current collector intimately contacts the carbonaceous material of the electrode. The carbonaceous material may be in the form of an assembly such as a planar cloth, sheet or felt. It is also envisioned that the electrode may be constructed in other shapes such as in the form of a cylindrical or tubular bundle of fibers. It is also apparent that an electrode in the form of a planar body of cloth, sheet or felt can be rolled up with a separator between the layers of the carbonaceous material, and with the opposed edges of the rolled up material, connected to a current collector. While copper metal has been used as a current collector, any electroconductive metal or alloy may be employed, such as, for example, silver, gold, platinum, cobalt, palladium, and alloys thereof. Likewise, while electrodeposition has been used in bonding a metal or metal alloy to the carbonaceous material, other coating techniques (including melt applications) or electroless deposition methods may be employed.

Suitable techniques for preparing the collector/carbonaceous material negative electrode are more fully described in co-pending application Ser. No. 729,702, entitled Improved Low Resistance Collector Frame for Electro-conductive Organic and Graphitic Materials, filed May 2, 1985, by F. P. McCullough and R. V. Snelgrove, now Pat. No. 4,631,116.

Generally, the mixture of alkali metals which is utilized in fabricating the anodes of the invention are molten at ambient temperatures, so that a heating element is not required so as to make the cell operational. The following table illustrates some of the alkali mixtures which can be employed.

TABLE I

| Melting Point °C. | Composition Wt. % | | | |
|---|---|---|---|---|
| | Cs | K | Rb | Na |
| −48 | 77.0 | 23.0 | | |
| −40 | 87.0 | | 13.0 | |
| −30 | 95.0 | | | 5.0 |
| −11 | | 78.0 | | 22.0 |
| −8 | | | 92.0 | 8.0 |
| 33 | | 32.0 | 68.0 | |

The electrolyte salt which is used in the present invention is an alkali metal tetrafluoroborate or a tetraalkyl ammonium tetrafluoroborate, especially lithium tetrafluoroborate, sodium tetrafluoroborate, tetraethylammonium tetrafluoroborate, tetrabutylammonium tetrafluoroborate, etc.

The electrolyte salt is added to a conventional organic solvent which is used in electrochemical storage devices such as ethylene carbonate, propylene carbonate, γ-butyrolactone, diethylene oxide diethylether (diglyme), and mixture thereof.

The concentration of the electrolyte salt in the solvent solution is chosen according to conventional means to maximize conduction or performance. In general, the molarity of the electrolyte salt in the solvent will be about 0.5 to about 8.0M, preferably from 3.0 to 5.0M.

The separator which is utilized in the cell of the invention may be any inert conventional separator, for example fiberglass, microporous polypropylene film such as available from Celanese Corporation under the trademark CELGARD.

BRIEF DESCRIPTION OF THE DRAWINGS

The present invention will be better understood from the following description of preferred embodiments of the invention together with the accompanying drawings wherein.

DETAILED DESCRIPTION OF THE PREFERRED EMBODIMENTS

Figure 1:
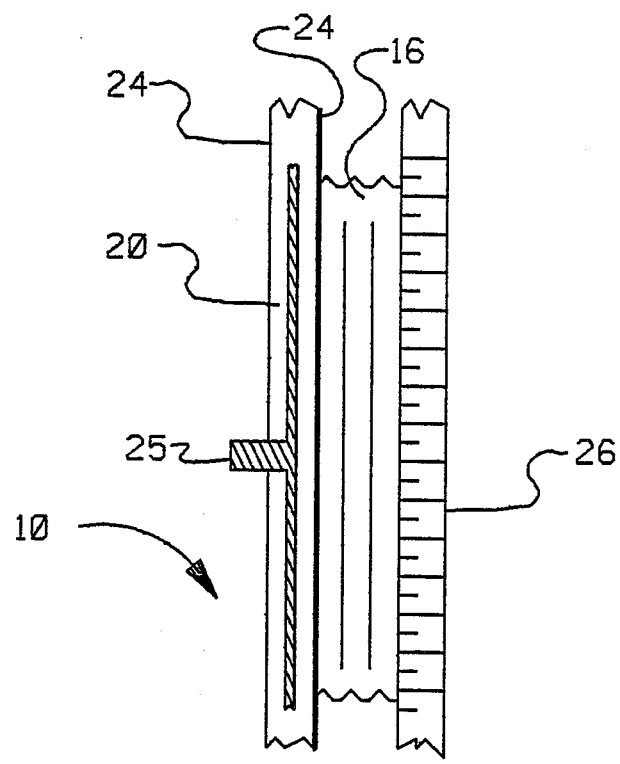
FIG. 1 is a schematic side elevational view, in cross-section, of an embodiment of the invention.

Referring to FIG. 1, a cell 10 within a housing (not shown) includes an anode assembly comprising an expanded metal matrix 20 in which the molten mixture of alkali metals for example, sodium-potassium in the molten state are retained.

A separator 24 encloses the anode assembly with a bipolar connector 25 passing through the separator 24. The separator 24 preferably comprises a fiberglass mat. The cathode comprises an activated carbon fiber mat 16 that is placed adjacent a bipolar plate 26, which is preferably aluminum.

In order to bring the battery to its operating temperature when the anode comprises a mixture of alkali metals which are not molten at ambient temperature, there is optionally provided a heater (not shown).

Figure 2:
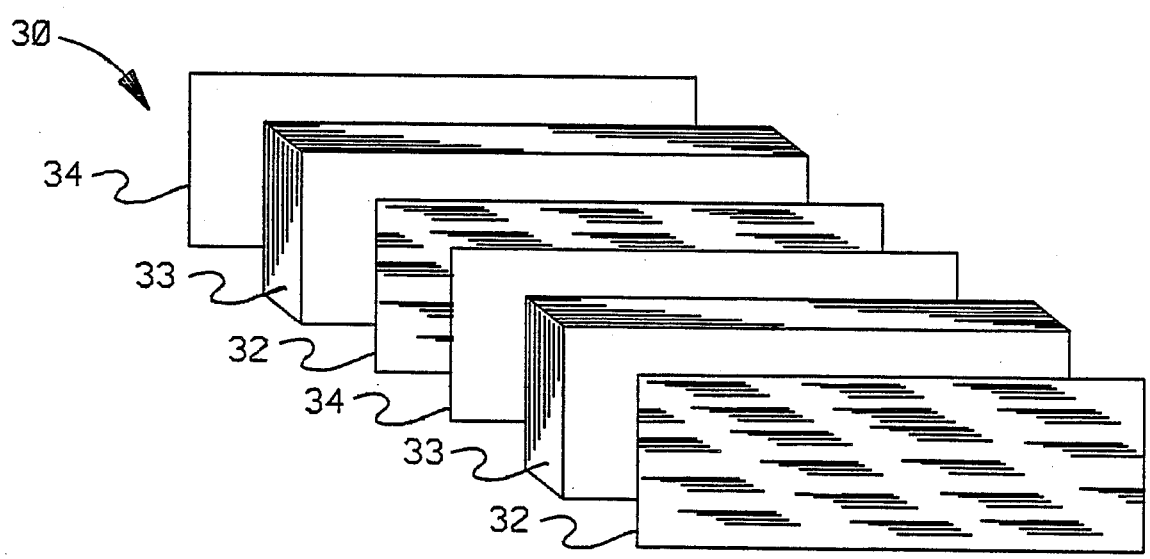
FIG. 2 is a partially broken away view of a flat plate multi-cell of the invention.

FIG. 2 illustrates a multi-cell assembly 30 showing two series connected cells separated by a bipolar plate metal connector 32. It is to be understood that the assembly 30 can include any number of cell units by use of additional bipolar separators and cell units. The assembly 30 includes cathode and anode plates 33 and 34. The anode 34 comprises a molten mixture of alkali metals on a metal screen containing 2.5 times the stoichrometric amount of alkali metal.

The cathode plate 33 comprises a 0.08 cm thick graphite cloth electrode having a bulk density of about 0.645 g/cc. The solvent electrolyte occuppies the voids of the graphite cloth electrode.

EXAMPLE

A. The following table shows the voltage values for the various cells of the invention.

TABLE II

| Solvent Electrolyte | Anode | Cathode | Load/Voltage (Volts) | | | | | | |
|---|---|---|---|---|---|---|---|---|---|
| | | | 10M | 1M | 100K | 10K | 1K | 100 | 10 |
| 0.5 wt. % ET$_4$NBF$_4$ in Diglyme | Na/k on Steel | ACF on Pt | 2.7 | 2.7 | 2.6 | 2.1 | 0.6 | 0.08 | 0.006 |
| 25 wt. % Bu$_4$NBF$_4$ in Diglyme | Na/k on Steel | ACF on Pt | 3.1 | 3.1 | 3.1 | 3.0 | 2.5 | 0.6 | 0.06 |
| 1.5 wt. % LiBF$_4$ in Diglyme | Na/k on Steel | ACF on Steel | 3.1 | 3.1 | 3.1 | 2.9 | 1.8–0.2 | 0.02 | 0.002 |
| 10 wt. % LiBF$_4$ in Diglyme | Na/k on Steel | ACF on Pt | 3.1 | 3.1 | 3.1 | 2.7 | — | 0.9 | 0.09 |
| Diglyme | Na/k on Steel | ACF on Pt | 3.1 | 3.0 | 2.7 | 1.3 | 0.2 | 0.02 | 0.002 |
| 10 wt. % NaBF (saturated) in Propylene carbonate | Na/k on Pt | ACF on Pt | 2.2 | 2.2 | 2.2 | 2.2 | 1.8 | 0.6 | 0.1 |
| 13 wt. % LiBF$_4$ in Propylene Carbonate | Na/k on Steel | Carbon fibers (basket weave) Cu plated | 2.6 | 2.6 | 2.5 | 1.7 | 0.7 | 0.16 | 0.02 |
| 15 wt. % LiBF$_4$ in Propylene carbonate | Na/k on Steel | Thornel Cu° Plated | 3.0 | 3.0 | 2.9 | 2.4 | 1.3 | 0.25 | 0.025 |
| 15 wt. % LiBF$_4$ in Propylene carbonate | Na/k on Steel | ACF on Pt | 2.6 | 2.6 | 2.6 | 2.5 | 1.9 | 1.8 | 0.5 |
| 23 wt. % Bu$_4$NBF$_4$ in Propylene carbonate | Na/k on Pt | ACF on Pt | 2.6 | 2.6 | 2.6 | 2.5 | 2.2 | 0.9 | 0.17 |
| 25 wt. % ET$_4$NBF$_4$ (Sat) in Propylene carbonate | Na/k on Pt | ACF on Pt | 2.9 | 2.9 | 2.9 | 2.9 | 2.8 | 0.7 | 0.09 |
| 11.5 wt. % ET$_4$NBF$_4$ (Sat) in Propylene carbonate | Na/k on Steel | ACF on Pt | 2.7 | 2.7 | 2.7 | 2.5 | 2.1 | 1.1 | 0.2 |
| 2.5 wt. % ET$_4$NBF$_4$ in Propylene carbonate | Na/k on Steel | ACF on Pt | 2.0 | 2.0 | 2.0 | 1.9 | 1.6 | 0.7 | 0.1 |
| Propylene carbonate | Na/k on Steel | ACF on Pt | 2.8 | 2.8 | 2.8 | 2.5 | 2.0–0.8 | 0.1 | 0.01 |
| 30 wt. % LiBF$_4$ in Ethylene carbonate | Na/k on Steel | ACF on Pt | 2.4 | 2.4 | 2.3 | 1.6 | 0.6 | 0.09 | 0.01 |
| 30 wt. % LiBF$_4$ in Ethylene carbonate T = 0° C. (Skin) | Na/k on Steel | ACF on Pt | 2.6 | 2.6 | 2.6 | 2.6 | 2.5 | 1.6 | 0.5 |

B. As a comparison the non-equilibrium voltage values of a commercially available size C ni-Cd cell (Model G.C.2 of General Electric Corporation) was determined. The results are as follows:

| | Load | | | | | | |
|---|---|---|---|---|---|---|---|
| | 10M | 1M | 100K | 10K | 1K | 100 | 10 |
| Volts | 1.27 | 1.27 | 1.27 | 1.27 | 1.27 | 1.26 | 1.21 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A non-aqueous electrochemical cell comprising:
   an anode comprising a molten mixture of at least two elements selected from the group consisting of sodium, potassium, cesium and rubidium;
   a cathod comprising an electrically conductive carbonaceous material; and,
   a non-aqueous electrolyte comprising:
   (1) a solvent, and
   (2) an electrolyte salt selected from the group consisting of an alkali metal tetrafluoroborate and a tetraalkyl ammonium tetrafluoroborate.

2. The electrochemical cell of claim 1, wherein said anode comprises a mixture of sodium and potassium.

3. The electrochemical cell of claim 1, wherein said electrolyte comprises an alkali salt of tetrafluoroborate.

4. The electrochemical cell of claim 3, wherein said electrolyte salt comprises a compound selected from the group consisting of lithium tetrafluoroborate and sodium tetrafluoroborate.

5. The electrochemical call of claim 1, wherein said electrolyte salt comprises tetraalkyl ammonium tetrafluoroborate.

6. The electrochemical cell of claim 5, wherein said electrolyte salt is selected from the group consisting of tetraethylammonium tetrafluoroborate and tetrabutylammonium tetrafluoroborate.

7. The electrochemical cell of claim 1, wherein said solvent comprises compounds selected from the group consisting of ethylene carbonate, propylene carbonate, γ-butyrolactone, diglyme and mixtures thereof.

8. The electrochemical cell of claim 1, wherein said carbonaceous material comprises activated carbon fibers.

9. The electrochemical cell of claim 1, wherein said anode is supported on an electrically conductive metal substrate.

* * * * *